April 13, 1937.   L. S. CASTONGUAY   2,076,548
PILOT CONTROLLED CUT-OFF VALVE
Original Filed March 3, 1930

Inventor
Leger S. Castonguay
By Edmund J. TePas
his Attorney

Patented Apr. 13, 1937

2,076,548

UNITED STATES PATENT OFFICE 2,076,548

PILOT CONTROLLED CUT-OFF VALVE

Leger S. Castonguay, Cuyahoga Falls, Ohio, assignor to The Patrol Valve Company, Cleveland, Ohio, a corporation of Ohio Original application March 3, 1930, Serial No. 432,708. Divided and this application November 18, 1931, Serial No. 575,887

6 Claims. (Cl. 137—161)

This invention relates to pilot controlled thermostatic valves and is a divisional application of my copending application Serial No. 432,708 filed by me March 3, 1930, for Gas burner control and ignition system.

One of the objects of this invention is to provide a generally simplified thermostatic cut-off valve having a minimum number of parts which are inexpensive to manufacture and which are arranged so that the valve may be readily assembled or disassembled.

A further object of this invention is to provide an improved and simplified cut-off valve in combination with pilot burner whose housing is utilized in housing certain of the valve parts.

With these and other objects in view, the invention consists in the novel construction, arrangement and combination of parts, hereinafter described, illustrated in some of its embodiments in the accompanying drawing and particularly pointed out in the appended claims.

Figure 1:
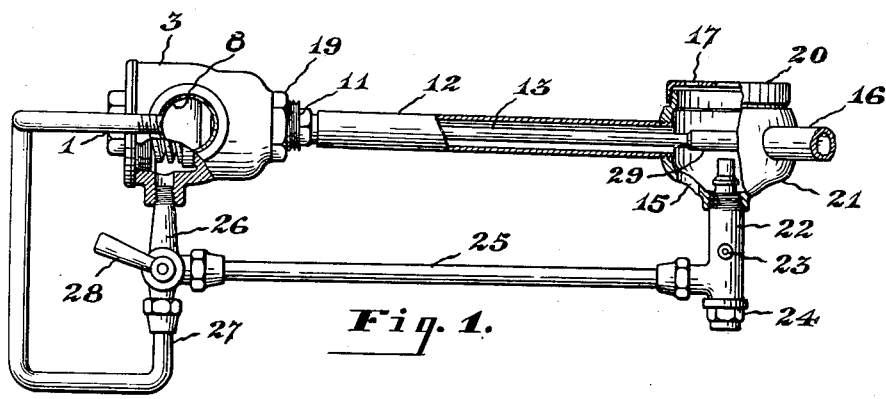
Figure 2:
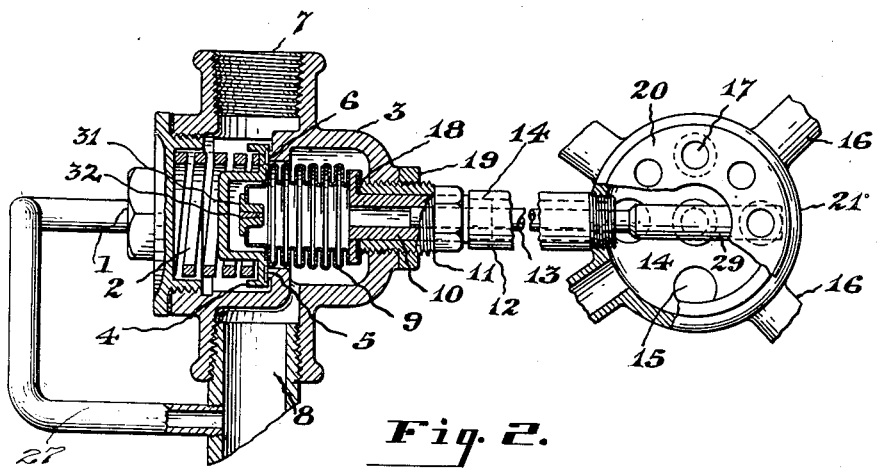
Figure 3:
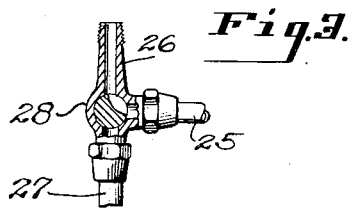

In the drawing, Figure 1, is a side elevational view partly in section, of my improved valve and pilot, and Figure 2 is an enlarged plan view of the valve and pilot, with the valve shown in a section taken through the axis thereof. Figure 3 is a detailed view partly in section of the pilot gas cock.

My improved device comprises a thermostatically actuated valve of the fluid expansion type having a body 3 with inlet and outlet ports 7 and 8 respectively, and a valve seat 6 formed therebetween. The valve head 4, has a seating face 5 formed from a suitable yielding material such as leather for engaging the valve seat 6, and is provided to control fluid flow through the body of the valve. A spring 2 engages the valve head to urge it to its closed position. This spring is held in place by a removable cap 1 carried in an opening formed in the side of the body 3.

The actuation of the valve head is effected by means of an expansible-contractible element or bellows 9 carried in the valve body. The bellows 9 is soldered or otherwise secured in sealed relation to the member 10, which is in turn connected in gas tight relation to the tube 13. The tube or conduit 13 is provided with a communicating enlarged portion 29 which is formed from a heat resistant metal such as monel, and is closed at its end. The enlarged portion 29 of the valve constitutes a thermostatic tip or bulb and is adapted to be positioned above the flame of the pilot burner 22. The bulb 29, conduit or tube 13, and the bellows 9, are adapted to be charged with a thermo-sensitive fluid so that when the bulb 29 is subjected to changes in temperature, the bellows expands or contracts thus effecting the operation of the valve. The free or movable end of the bellows 9 is provided with a fitting 31 having a tapered hole for reception of the tapered pin 32 which is inserted and sealed in place with solder after the bellows has been charged with the thermo-sensitive fluid.

The source of thermal energy for the operation of the valve is provided by means of a pilot burner 22 having primary air ports 23, whereby a blue flame is provided at the tip of the burner. The pilot burner is provided with a needle adjustment valve, not shown, accessible upon removal of the cap 24. Gas to the pilot burner 22 is supplied by way of the tube 25 under control of the three-way valve 28. The valve is adapted in one position to supply gas to the pilot by way of the conduit 26 which is in communication with the inlet side of the valve body 3. A second conduit 27 is adapted to be connected to the gas supply line at the outlet side of the valve body 3 so that by shifting the valve 28 from one position to another, the gas supply of the pilot burner may be taken from a position either ahead of or behind the cut-off valve.

The three-way valve 28 is provided for the purpose of initially placing the thermostatic valve in operation and after its opening has been effected, the gas supply for the pilot burner 22 can then be taken from the outlet side of the cut-off valve by shifting the valve 28, which operation of the valve serves to cut off communication to the pilot by way of the conduit 26. By this arrangement, extinguishment of the pilot burner and the resultant closing of the thermostatic valve cuts off the supply of gas to the pilot burner as well as the other burners which are controlled by the cut-off valve.

The pilot burner 22 is positioned in a housing 21 having a removable cap 20 for the upper portion thereof. Air ports 17 and 15 are provided in the cap and body 20 and 21 for the purpose of furnishing the secondary air supply necessary to support the flame of the pilot burner. The housing 21 is provided with flash tubes 16 for the ignition of burners located remote from the housing. The burner ignition device is not shown in detail as it does not form a part of this invention. The pilot burner housing 21 is connected to the valve body 3 by means of the tube 12, which is threadably received in the housing 21 and slidably fitted at its other end over the reduced portion 14 of the member 10.

My improved pilot and cut-off valve is particularly useful in connection with pilot controlled gas ranges, but it is not necessarily limited to such use as will be readily understood by anyone familiar with gas burning appliances.

An adjusting member 11 is threadably received in the valve body 3 and provides a means for shifting the bellows 9 in the valve body so that the operation of the valve may be varied by shifting the bellows toward or away from the valve seat. A locknut 19 is provided for locking the adjustment member 11 in the desired position. A washer 18 of suitable packing material is provided between the element 10, and the adjusting member 11 to prevent the escape of gas at this point.

One of the important features of my invention is that of arranging the valve parts and pilot so that the thermostatic element may be readily removed from or replaced in the valve body as a unit. This result is accomplished by arranging the valve body with an opening in the side, whereby upon removal of the cap 1, which provides a closure for this opening, the valve spring 2, the valve head 4, the bellows 9, the tube 13 and the bulb 29 may be removed by simply withdrawing them through the stated opening. These operations are effected without necessitating the removal of the valve body 3 from the gas line, which operation would involve considerable work.

Another important feature of my invention is that of effectively housing the thermostat by means of the tube 12, and the housing 21. By this arrangement, the thermostat is shielded from the heat that may be produced by sources other than the pilot 22, so that the thermostat is solely responsive to the heat of the pilot burner. The thermostat is very rapid in its operation by reason of its being located in the pilot housing in the air stream between the air openings 15 and 17, and in position directly above the pilot burner. By this arrangement, the thermostat is rapidly heated by the pilot and upon the extinguishment of the pilot, the thermostat is rapidly cooled by the natural draft through the housing 21.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

Having thus described my invention, what I claim is:—

1. In a thermostatic valve, in combination, a valve body having communicating inlet and outlet openings with valve port substantially midway therebetween and a side opening in the valve body opposite to the valve port, a closure cap for the side opening of said valve body, a valve member operatively associated with the valve port of said valve body for controlling fluid flow therethrough, a thermostat operatively connected to said valve member, and means to adjust said thermostat with respect to said valve so as to change the temperature at which said valve member is actuated, said thermostat and closure cap being disposed on opposite sides of said valve port, said thermostat and valve member being removable through the side opening of said valve body.

2. In a thermostatic valve, in combination, a valve body having communicating inlet and outlet openings with valve port substantially midway therebetween and a side opening in the valve body opposite to the valve port, a closure cap for the side opening of said valve body, a valve member operatively associated with the valve port of said valve body for controlling fluid flow therethrough, a thermostat operatively connected to said valve member and carried by said valve body, said thermostat and closure cap being disposed on opposite sides of said valve port and means to shift said thermostat bodily in said valve body so as to change the temperature at which said valve member is actuated, said valve member and thermostat being removable through the side opening of said valve body.

3. In a thermostatic valve, in combination, a valve body having communicating inlet and outlet openings with valve port substantially midway therebetween and a side opening in the valve body opposite to the valve port, a closure cap for the side opening of said valve body, a valve member operatively associated with the valve port of said valve body for controlling fluid flow therethrough, a thermostat operatively connected to said valve member comprising an expansible-contractible vessel in communication with a sealed container providing a chamber for the confinement of a thermo-sensitive fluid, said thermostat and closure cap being disposed on opposite sides of said valve port, means to shift said thermostat bodily to vary the temperature at which said valve member is operated, said thermostat and valve member being removable through the side opening of said valve body.

4. In a device of the kind described, a valve body having inlet and outlet ports for fluid and having a relatively large opening and a relatively small opening, a thermostatically-controlled-valve-means including a valve for controlling the flow of fluid through said ports and including a thermostat operatively associated with the valve, said means having a reduced part extending outwardly from the valve body through the smaller opening and having a part within the valve body larger than the small opening, means adjustably connected to the valve body and engaging the enlarged part to adjustably position the same in said valve body, said thermostatically-controlled-valve-means being insertable and removable as a unit from the valve body through the larger opening, and a cap for closing the larger opening.

5. In a device of the kind described, a valve body having an inlet port, an outlet port, and a valve port for the flow of fluid therethrough and having a relatively large opening and a relatively small opening, a thermostatically controlled valve means including a valve for controlling the valve port, said valve being disposed on one side of the port, said means also including a thermostat disposed on the opposite side of the valve port and operatively associated with the valve and removable through said port, said means having a reduced part extending outwardly from the valve body through the smaller opening and having a part within the valve body larger than the small opening, said thermostatically-controlled-valve-means being insertable and removable from the valve body through the larger opening, and a cap for closing the larger opening.

6. In a device of the kind described, a valve body having an inlet port, an outlet port, and a valve port for the flow of fluid therethrough and having a relatively large opening and a relatively small opening, a thermostatically controlled valve means including a valve for controlling the valve port, said valve being disposed on one side of the port, said means also including a thermostat disposed on the opposite side of the valve port and operatively associated with the valve, said thermostat being smaller in diameter than the valve port for removal therethrough, said thermostat having a part extending outwardly from the valve body through the smaller opening, means for sealing said part to the valve body at said smaller opening, said thermostatically-controlled-valve-means being insertable and removable from the valve body through the larger opening, and a cap for closing the larger opening.

LEGER S. CASTONGUAY.